(12) United States Patent
Halila et al.

(10) Patent No.: US 6,604,286 B2
(45) Date of Patent: Aug. 12, 2003

(54) METHOD OF FABRICATING GAS TURBINE FUEL INJECTION

(75) Inventors: Ely Eskenazi Halila, Cincinnati, OH (US); Michael Anderson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/274,760

(22) Filed: Oct. 21, 2002

(65) Prior Publication Data

US 2003/0046935 A1 Mar. 13, 2003

Related U.S. Application Data

(62) Division of application No. 09/733,447, filed on Dec. 8, 2000.

(51) Int. Cl.[7] .................................. F02C 7/22
(52) U.S. Cl. .................................. 29/890.02
(58) Field of Search ..................... 60/737, 738, 740, 60/748; 29/890.02

(56) References Cited

U.S. PATENT DOCUMENTS

| | | | | |
|---|---|---|---|---|
| 3,788,067 A | * | 1/1974 | Carlisle et al. | 60/748 |
| 4,763,481 A | * | 8/1988 | Cannon | 60/737 |
| 5,490,389 A | * | 2/1996 | Harrison et al. | 60/737 |
| 6,339,923 B1 | * | 1/2001 | Halila et al. | 60/738 |

* cited by examiner

Primary Examiner—Louis J. Casaregola
(74) Attorney, Agent, or Firm—William Scott Andes; Armstrong Teasdale LLP; Robert B. Reeser, III

(57) ABSTRACT

A combustor for a gas turbine engine including a pilot fuel injection assembly that includes a replaceable heat shield is described. The pilot fuel injection assembly also includes a fuel stem and a mixer divider. The fuel stem includes a first end, a second end, and a body extending therebetween. An alignment slot is defined within a portion of the interface between the fuel stem body and the second end. The mixer divider is attached to the fuel stem second end and the heat shield is removably coupled to the mixer divider with a plurality of transfer tubes.

4 Claims, 3 Drawing Sheets

ମethod OF FABRICATING GAS TURBINE
FUEL INJECTION

This application is a divisional of U.S. Application No. 09/733,447, filed Dec. 8, 2000, which is hereby incorporated by reference.

STATEMENT REGARDING FEDERALLY SPONSORED RESEARCH OR DEVELOPMENT

The U.S. Government may have certain rights in this invention pursuant to contract number NAS3-27325 awarded by the National Aeronautical & Space Administration.

BACKGROUND OF THE INVENTION

This application relates generally to combustors and, more particularly, to gas turbine combustors including pilot fuel injectors.

Air pollution concerns worldwide have led to stricter emissions standards both domestically and internationally. Aircraft are governed by both Environmental Protection Agency (EPA) and International Civil Aviation Organization (ICAO) standards. These standards regulate the emission of oxides of nitrogen (NOx), unburned hydrocarbons (HC), and carbon monoxide (CO) from aircraft in the vicinity of airports, where they contribute to urban photochemical smog problems. Most aircraft engines are able to meet current emission standards using combustor technologies and theories proven over the past 50 years of engine development. However, as aircraft fly in higher altitudes, such combustor technology may not be applicable. In particular, such technology is not effective for supersonic aircraft as they fly through the stratoshperic ozone.

To minimize potentially detrimental emissions caused during operation at higher altitudes, at least some known aircraft engines include multi-stage radial axial (MRA) combustors. MRA combustors include a plurality of fuel/air mixing tubes and an independent pilot fuel injector system. The pilot fuel injector system supplies fuel to the combustor during start-up and low power operations to facilitate low-power engine flame stability, and during increased power operations, fuel is staged independently through the fuel/air mixing tube while increasing a fuel/air ratio supplied to the pilot fuel injector system.

At least some known pilot fuel injector systems include multiple piece assemblies including a fuel stem and an integral mixer/heat shield. The fuel stem is inserted within a cavity defined within the mixer/heat shield and includes a plurality of structural extensions spaced circumferentially for securing an end of the fuel stem within the mixer/heat shield and prevents contact with the mixer/heat shield.

To thermally insulate the fuel stem from hot gases flowing within the combustor, the heat shield is placed around the fuel stem. The heat shield is thus exposed to higher temperatures than the fuel stem and is typically cast from high temperature alloys which possess high temperature and stress capabilities without sacrificing useful life requirements. Over time, because of continued exposure to high temperatures, the heat shield may need to be replaced. Because the heat shield and mixer comprise the same assembly, when the heat shield is replaced the mixer must also be removed. As a result, multiple spare parts are needed to maintain the pilot fuel injector system.

BRIEF SUMMARY OF THE INVENTION

In an exemplary embodiment, a combustor for a gas turbine engine includes a pilot fuel injection assembly including a replaceable heat shield. The pilot fuel injection assembly also includes a fuel stem and a mixer divider. The fuel stem includes a first end, a second end, and a body extending therebetween. An alignment slot is defined within a portion of the interface between the fuel stem body and the second end. The mixer divider is attached to the fuel stem second end and defines a cavity between the fuel stem and the mixer divider. The heat shield is removably coupled to the mixer divider with a plurality of transfer tubes, and defines a cavity between the mixer divider and the heat shield.

During assembly of the pilot fuel injection assembly, as a portion of the fuel stem is received within the mixer divider, the fuel stem slot positions the mixer divider in alignment with respect to the fuel stem. The heat shield is then held in place radially around the mixer divider and the transfer tubes are extended from the heat shield to the mixer divider. Because the transfer tubes are attached only to the heat shield, a slip joint is created between the transfer tubes and the mixer divider. More specifically, because a first end of each transfer tube is attached to the mixer divider, and a second end of each transfer tube is inserted through the heat shield, a slip joint is created. As a result, during operation, vibrational loading induced within the heat shield is transmitted to the combustor through the fuel stem. Furthermore, the slip joint eliminates thermal growth differential between the heat shield and the mixer divider, and enables the heat shield to be replaced without removing the fuel stem from the mixer divider.

DETAILED DESCRIPTION OF THE INVENTION

Figure 1:
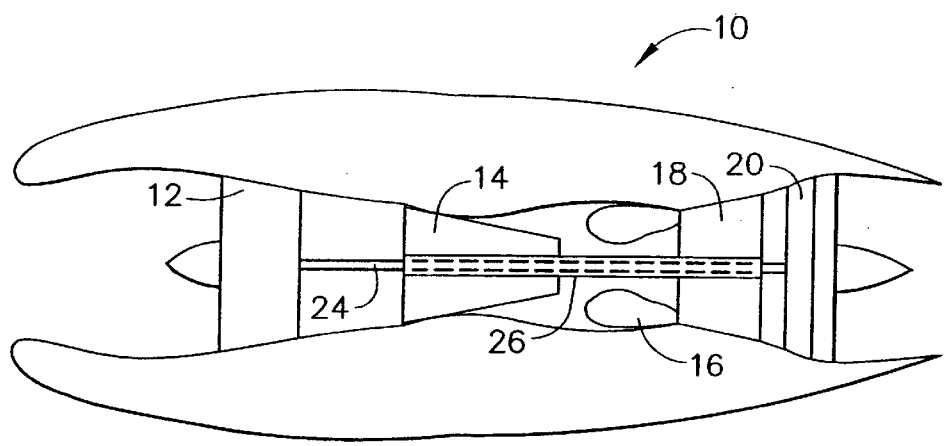
FIG. 1 is a schematic illustration of a gas turbine engine.

FIG. 1 is a schematic illustration of a gas turbine engine 10 including a fan/booster 12, a high pressure compressor 14, and a combustor 16. Engine 10 also includes a high pressure turbine 18, and a low pressure turbine 20. Fan/booster 12 and turbine 20 are coupled by a first rotor shaft 24, and compressor 14 and turbine 18 are coupled by a second rotor shaft 26.

In operation, air flows through fan/booster 12 to high pressure compressor 14. Compressed air is then delivered to combustor 16 and airflow from combustor 16 drives turbines 18 and 20.

Figure 2:
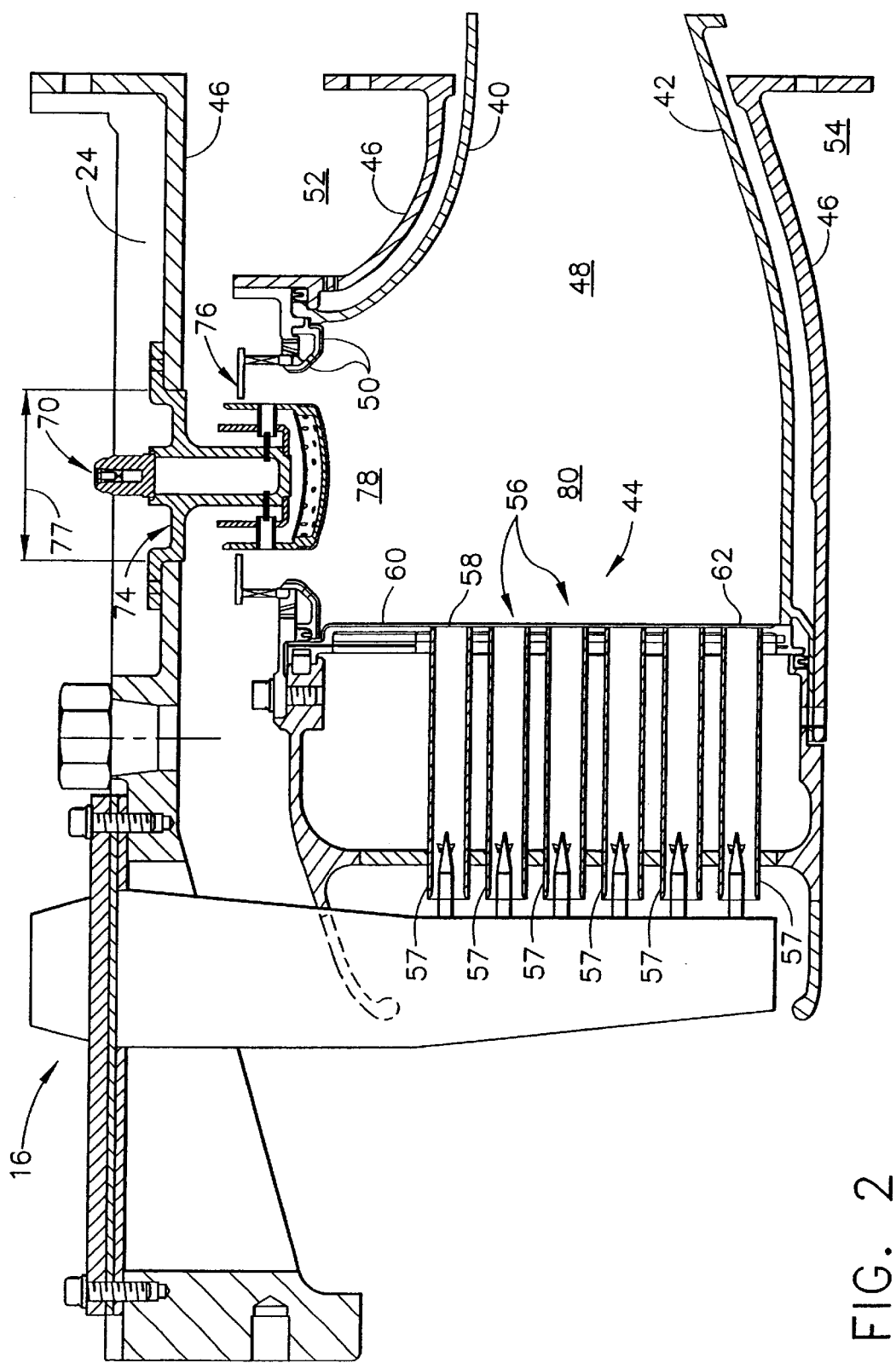
FIG. 2 is a cross-sectional view of a combustor used with the gas turbine engine shown in FIG. 1.

FIG. 2 is a cross-sectional view of combustor 16 used with gas turbine engine 10 (shown in FIG. 1). In one embodiment, combustor 16 is a multi-stage radial axial (PA) combustor that may be applied with an LM6000 engine commercially available from General Electric Aircraft Engines, Cincinnati, Ohio. Combustor 16 includes an annular outer liner 40, an annular inner liner 42, and a domed end 44 extending between outer and inner liners 40 and 42, respectively. Outer liner 40 and inner liner 42 are spaced radially inward from a combustor casing 46 and define a combustion chamber 48. Combustion chamber 48 is generally annular in shape and is disposed radially inward from liners 40 and 42. Outer liner 40 includes a plurality of connected pilot liner segments 50. Outer liner 40 and combustor casing 46 define an outer passageway 52 and inner liner 42 and combustor casing 46 define an inner passageway 54.

Combustor domed end 44 includes a plurality of heat shields 56 attached to fuel/air mixing tubes 57 that are mounted to a dome support 58 extending between combustor liners 40 and 42. More specifically, combustor outer liner 40, inner liner 42, and a dome shroud 60 are supported by dome support 58.

A pilot fuel injector assembly 70, described in more detail below, is independent of fuel/air mixing tubes 57 and is attached to combustor casing 46 with a plurality of fasteners (not shown). More specifically, pilot fuel injector assembly 70 is attached to an outer surface 72 of combustor casing 46 downstream from dome shroud 60 and extends radially inward through an opening 74 in combustor casing 46 through outer passageway 52 towards an opening 76 in combustor outer liner 40. Combustor casing opening 74 has a diameter 77.

Pilot fuel injector assembly 70 is in flow communication with combustion chamber 48 and supplies a fuel/air mixture to combustion chamber 48. More specifically, pilot fuel injector assembly 70 is in flow communication with a first combustion zone 78 defined within combustor chamber 48 by dome shroud 60 and outer liner pilot liner segments 50. In use, pilot fuel injector assembly 70 provides a fuel-air mixture to combustor chamber 48.

Figure 4:
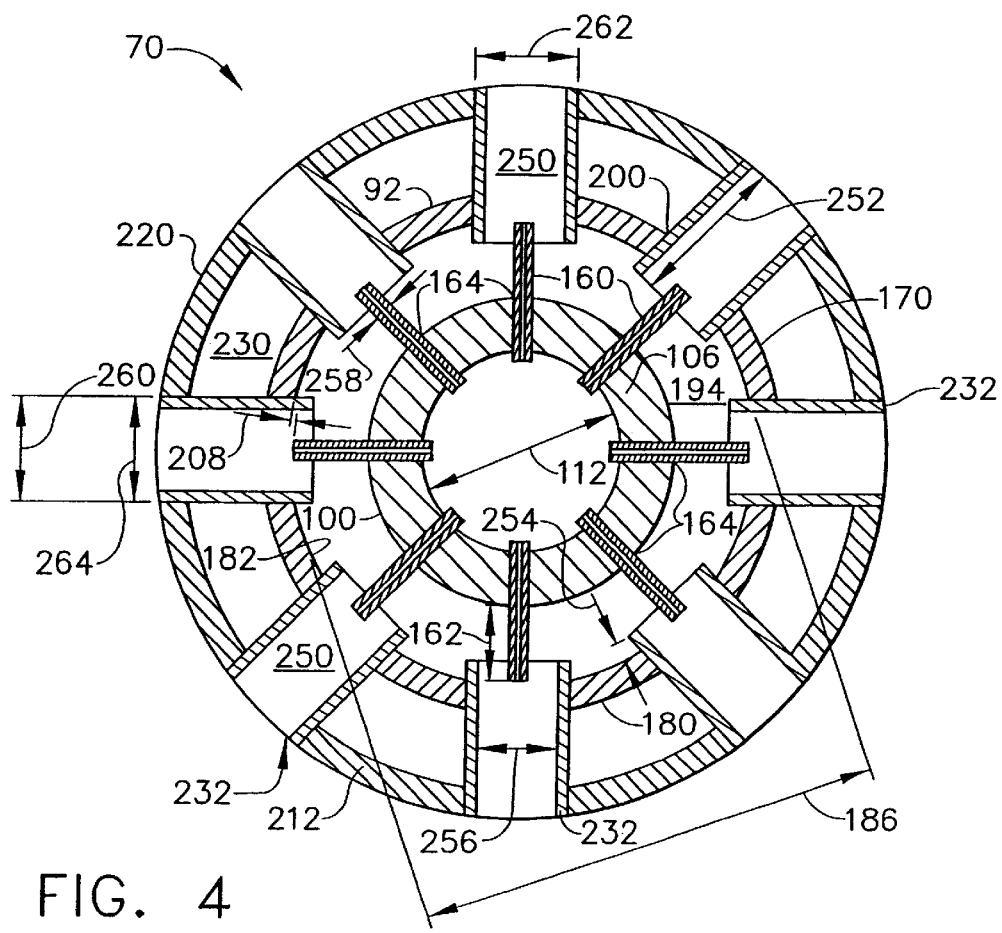
FIG. 4 is a cross-sectional view of the pilot fuel injector shown in FIG. 3 taken along line 4—4.
Figure 3:
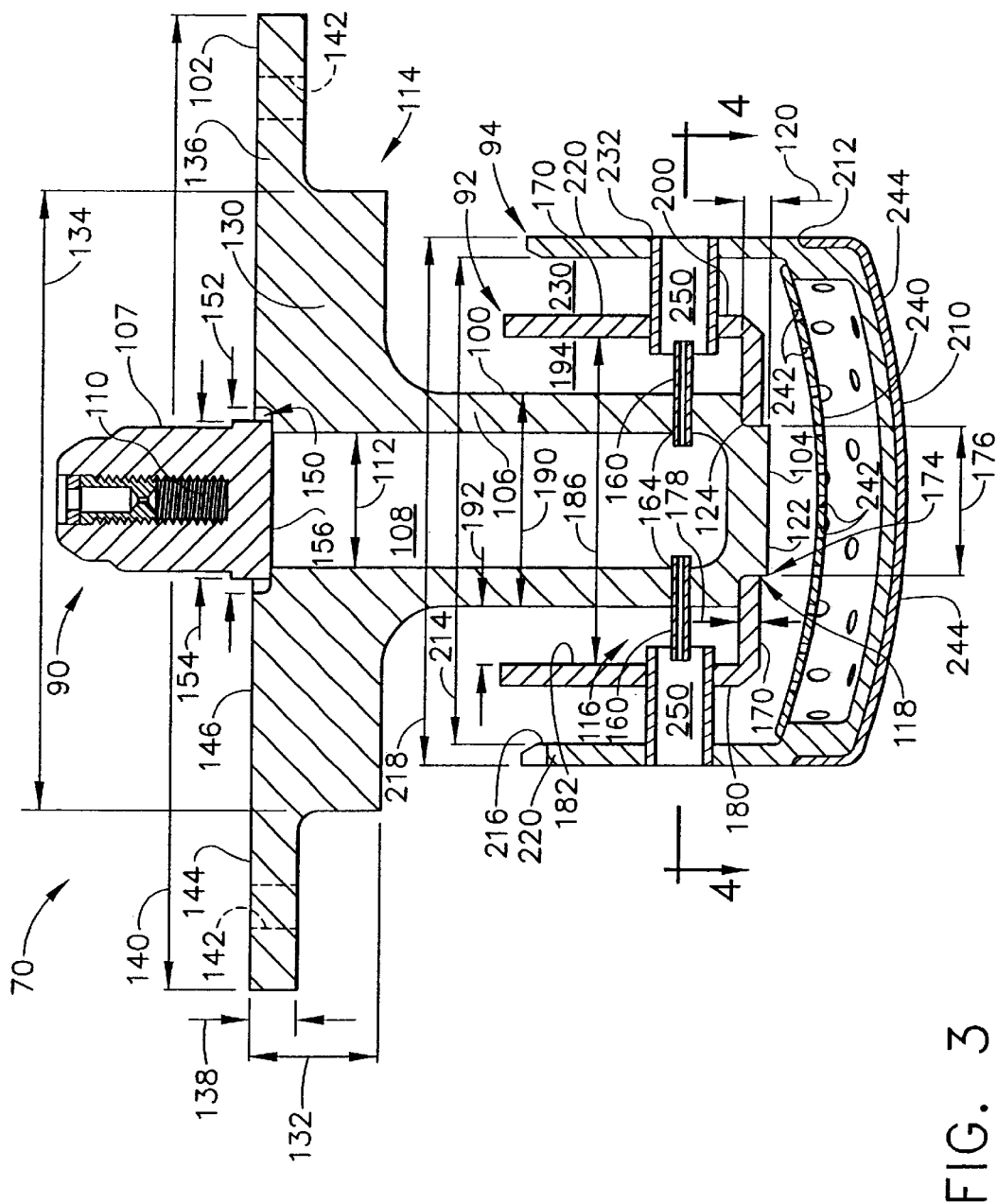
FIG. 3 is an enlarged cross-sectional view of a pilot fuel injector assembly used with the combustor shown in FIG. 2.

FIG. 3 is an enlarged cross-sectional view of pilot fuel injector assembly 70 used with combustor 16 (shown in FIGS. 1 and 2) and FIG. 4 is a cross-sectional view of pilot fuel injector assembly 70 taken along line 4—4 (shown in FIG. 3). Pilot fuel injector assembly 70 includes a fuel injection sub-assembly 90, a mixer divider 92, and a heat shield 94. Fuel injection sub-assembly 90 includes a fuel stem 100 including a first end 102, a second end 104, and a body 106 extending therebetween. Fuel injection sub-assembly 90 also includes an inlet fuel fitting connector 107 attached to fuel stem first end 102 and including an orifice 110 extending longitudinally therethrough.

Fuel stem body 106 is substantially cylindrical and includes a bore 108 extending between fuel stem first and second ends 102 and 104, respectively. Bore 108 is concentrically aligned with respect to inlet connector orifice 110 and is in flow communication with inlet connector orifice 110. Bore 108 has a diameter 112 that is substantially constant between fuel stem body first and second ends 102 and 104, respectively.

Fuel stem body 106 includes a first portion 114 and a second portion 116. Body second portion 116 is substantially cylindrical extending from fuel stem second end 104 to body first portion 114. Body second portion 116 extends from fuel stem second end 104 to form a slot 118. Slot 118 is defined at least partially circumferentially around fuel stem body 106. Slot 118 has a height 120 measured between an outer surface 122 of fuel stem second end 104 and a shoulder 124 defined between fuel stem second end 104 and body second portion 116.

Fuel stem body first portion 114 curves to extend outwardly from fuel stem body second portion to form an inner flange 130. Inner flange 130 includes structural ribs 131 having a thickness 132. Ribs 131 support fuel stem body 106. Inner flange 130 includes a diameter 134 that is slightly larger than combustor casing opening diameter 77 (shown in FIG. 2) and accordingly, fuel stem inner flange 130 contacts combustor casing 46 (shown in FIG. 2) to position pilot fuel injection assembly 70 with respect to combustor casing opening 74 (shown in FIG. 2).

Fuel stem body first portion 114 also includes an outer flange 136. Outer flange 136 extends from inner flange 130 and has a thickness 138 that is less than rib thickness 132. Outer flange 136 has a diameter 140 and includes a plurality of openings 142 extending therethrough. Openings 142 are sized to receive a plurality of fasteners (not shown) used to secure pilot fuel injection system 70 to combustor 16. An outer surface 144 of outer flange 136 is substantially planar with an outer surface 146 of inner flange ribs 131.

Fuel stem body first end 102 includes a recess 150 extending from inner flange outer surface 146 towards fuel stem body second end 104. Recess 150 has a diameter 152. Inlet fuel fitting connector 107 has an outer diameter 154 adjacent a base 156 of inlet connector 108 that is smaller than fuel stem body first end recess 150. Accordingly, inlet connector 107 is received and attached within fuel stem body recess 150. In one embodiment, inlet connector 107 is welded within fuel stem body recess 150.

A plurality of fuel injectors 160 are attached to fuel stem body 106 and extend radially outward from fuel stem body 106 a distance 162. Fuel injectors 160 are spaced circumferentially around fuel stem body 106. In one embodiment, each pilot fuel injector assembly 70 includes eight fuel injectors 160. More specifically, each fuel injector 160 is attached to fuel stem body 106 to extend through an opening 164 in fuel stem body 106, and thus, each fuel injector 160 is in flow communication with fuel stem body bore 108 and inlet connector orifice 110.

Mixer divider 92 includes a substantially circular base 170 and a sidewall 172. Sidewall 172 extends circumferentially from base 170. More specifically, sidewall 172 extends substantially perpendicularly from base 170 towards fuel stem first end 102. Base 170 includes an opening 174 having a diameter 176. Base 170 also has a thickness 178 measured between an outer surface 180 and an inner surface 182 of mixer divider 92.

Mixer divider 92 has an inner diameter 186 measured with respect to mixer divider inner surface 182 extending over sidewall 172, and an outer diameter 188 measured with respect to mixer divider outer surface 180 extending over sidewall 172. Mixer divider inner diameter 186 is larger than an outer diameter 190 of fuel stem second body portion 116. Accordingly, because mixer divider sidewall 172 is a distance 192 from fuel stem body 106, a cavity 194 is defined between mixer divider 92 and fuel stem 100. Furthermore, mixer divider sidewall distance 192 is larger than fuel injector distance 162.

Mixer divider sidewall 172 includes a plurality of openings 200 spaced circumferentially around mixer divider 92. More specifically, each opening 200 is concentrically aligned with respect to a respective fuel injectors 160 extending radially outward from fuel stem body 106. Accordingly, each mixer divider sidewall opening 200 is in flow communication with a respective fuel injector 160. Furthermore, in the exemplary embodiment, because mixer divider sidewall distance 192 is larger than fuel injector distance 162, fuel injectors 160 do not extend into mixer divider sidewall openings 200 and an axial clearance 208 is defined between each fuel injector 160 and mixer divider sidewall 172. In an alternative embodiment, mixer divider sidewall distance 192 permits fuel injectors 160 to extend into mixer divider sidewall openings 200.

Heat shield 94 includes a substantially circular curved base 210 and a sidewall 212. Heat shield sidewall 212 extends circumferentially from heat shield base 210. In one embodiment, heat shield sidewall 212 is substantially parallel with mixer divider sidewall 172.

Heat shield 94 has an inner diameter 214 measured with respect to an inner surface 216 of heat shield 94 extending over sidewall 212, and an outer diameter 218 measured with respect to an outer surface 220 of heat shield 94 extending over sidewall 212. Heat shield inner diameter 214 is larger than mixer diameter outer diameter 188. Accordingly, a cavity 230 is defined between mixer divider 92 and heat shield 94.

Heat shield sidewall 212 includes a plurality of openings 232 spaced circumferentially around heat shield 94. More specifically, each heat shield opening 232 is concentrically aligned with respect to a respective mixer divider sidewall opening 200. Accordingly, each heat shield opening 232 is in flow communication with a respective fuel injector 160 and permits each fuel injector 160 to be in flow communication with combustion chamber 48.

Heat shield 94 also includes an impingement baffle 240 extending across heat shield base 210 within cavity 230. Impingement baffle 240 includes a plurality of openings 242 that meter an amount of air flow to heat shield base 210. Base 210 also includes a plurality of openings 244 extending between heat shield bottom outer surface 220 and heat shield bottom inner surface 216. Openings 244 permit impingement air to exit into combustion chamber combustion zone 78.

A plurality of transfer tubes 250 extend radially inward and secure heat shield 94 in position to pilot fuel injector assembly 70 relative to mixer divider 92. More specifically, each transfer tube 250 is attached to heat shield 94 within a heat shield sidewall opening 232 and extends radially inward through a corresponding mixer divider sidewall opening 200. Each transfer tube 250 has a length (not shown) that permits each tube to extend through each respective mixer divider sidewall opening 200 a distance 254. Furthermore, each opening 232 has a diameter 256 that is larger than a diameter 258 of each respective divider sidewall opening 200.

Each transfer tube 250 also has an outer diameter 260 that is slightly smaller than mixer divider sidewall opening diameter 258, such that each transfer tube 250 is received in slidable contact in an interference fit within each respective mixer divider sidewall opening 200. Furthermore, transfer tube outer diameter 260 is also smaller than each heat shield sidewall opening diameter 256. Because each transfer tube 250 is received in slidable contact with each mixer divider sidewall opening 200, a slip joint is created between transfer tubes 250 and mixer divider 92. The slip joint eliminates thermal interference between heat shield 94 and mixer divider 92.

During assembly of pilot fuel injector assembly 70, initially fuel injectors 160 are fixedly secured to fuel stem 100. More specifically, each fuel injector 160 is inserted and attached within a respective fuel stem body opening 164. In one embodiment, fuel injectors 160 are brazed to fuel stem 100. Fuel stem 100 is then pressure-checked to ensure no undesirable leakage exists between fuel injectors 160 and fuel stem 100.

Mixer divider 92 is then positioned adjacent fuel stem 100. Specifically, mixer divider 92 is inserted over fuel stem 100 such that fuel stem second end 104 is received within mixer divider base opening 174. More specifically, as fuel stem 100 is inserted within mixer divider base opening 174, fuel stem slot 118 contacts mixer divider base 170 and positions mixer divider 92 in alignment with respect to fuel stem 100 such that axial distance 208 is defined between each fuel injector 160 and mixer divider sidewall 172, and such that each mixer divider sidewall opening 200 is tangentially aligned with respect to a corresponding fuel injector 160. Mixer divider 92 is then fixedly attached to fuel stem 100. In one embodiment, mixer divider 92 is welded to fuel stem 100 between mixer divider base 170 and fuel stem second end 104.

In an alternative embodiment, fuel stem 100 does not include slot 118 and mixer divider 92 does not include pre-fabricated sidewall openings 200, but rather mixer divider 92 is held in place against fuel stem 100 prior to fuel injectors 160 being installed, and mixer divider openings 200 and fuel stem openings 164 are created with a drill and an electrochemical machining (EDM) process. Fuel injectors 160 and mixer divider 92 are then attached to fuel stem 100 as described above.

Heat shield 94 is then inserted radially around mixer divider 92 and rotated to align heat shield sidewall openings 232 with respect to mixer divider openings 200. Transfer tubes 250 are inserted within heat shield openings 232 to extend through mixer divider sidewall openings 200. After positioned properly, transfer tubes 250 are fixedly secured to heat shield 94. In one embodiment, transfer tubes 250 are brazed to heat shield 94. The entire pilot fuel injection assembly 70 is then secured within engine 10 (shown in FIG. 1).

In use, as fuel is supplied to pilot fuel injection assembly 70 through inlet connector, 107, fuel flows through connector orifice 110 into fuel stem bore 108. Fuel then flows radially outward through fuel injectors 160 into transfer tubes 250 where it is pre-mixed with air flowing into transfer tubes from cavity 194. The fuel-air mixture is then injected into combustion chamber combustion zone 78 and ignited.

Simultaneously, air is drawn circumferentially into cavity 230 through impingement baffle 240 to cool heat shield 94. Additional air is drawn into cavity 194 to mix with fuel. Baffle openings 242 meter an amount of cooling air flowing to heat shield base 210. As air flows through heat shield base openings 244, heat shield 94 is cooled. Furthermore, air exiting pilot fuel injection assembly 70 flows in close proximity to combustor outer liner segments 50 to prevent potentially harmful boundary layer flow conditions from developing within combustor combustion chamber 48.

In addition, because transfer tubes 250 are only fixedly attached to heat shield 94, the slip joint created between transfer tubes 250 and mixer divider 92 permits vibrational and stress loading induced within heat shield 94 to be transmitted to combustor 16 through fuel stem 100. Furthermore, transfer tubes 250 permit heat shield 94 and transfer tubes 250 to be easily interchanged if replacement is desired, without replacing other fuel injection components 160. In addition, because transfer tube outer diameter 260 is larger than divider sidewall opening diameter 258 stack-up errors between fuel injectors 160 and heat shield 94 are reduced.

The above-described pilot fuel injection assembly is cost-effective and highly reliable. The pilot fuel injection assembly is assembled outside of the engine and includes an integral mixer divider and fuel injection subassembly. Because the heat shield is removably coupled to the mixer divider, vibrational loading is transmitted to the combustor from the heat shield through the fuel stem. Furthermore, the heat shield is replaceable without disassembling the fuel stem from the mixer divider.

While the invention has been described in terms of various specific embodiments, those skilled in the art will recognize that the invention can be practiced with modification within the spirit and scope of the claims.

What is claimed is:

1. A method for fabricating an integral pilot fuel injector assembly for a gas turbine engine, the pilot fuel injector assembly including a fuel stem, a mixer divider, and a heat shield, the fuel stem comprising a first end, a second end, and a body extending therebetween, said method comprising the steps of:

attaching a plurality of fuel injectors to the fuel stem to extend radially outward from the fuel stem;

attaching the mixer divider to the fuel stem second end; and slidably coupling the heat shield to the mixer divider.

2. A method in accordance with claim 1 wherein the fuel stem second end includes a slot, said step of attaching the mixer divider further comprises the step aligning the mixer divider relative to the fuel stem with the fuel stem slot.

3. A method in accordance with claim 2 wherein the mixer divider includes a plurality of openings, said step of aligning the mixer divider further comprises the step of positioning the mixer divider openings in concentric alignment with respect to the fuel injectors.

4. A method in accordance with claim 3 wherein the heat shield includes a plurality of openings, said step of slidably coupling the heat shield further comprises the step of attaching a transfer tube to each heat shield opening such that the transfer tube extends through the mixer divider openings and such that each transfer tube is in slidable contact with the mixer divider.

* * * * *